United States Patent [19]

Wilkinson et al.

[11] Patent Number: 5,765,015
[45] Date of Patent: Jun. 9, 1998

[54] SLIDE NETWORK FOR AN ARRAY PROCESSOR

[75] Inventors: Paul Amba Wilkinson, Apalachin; Thomas Norman Barker, Vestal; James Warren Dieffenderfer, Owego; Peter Michael Kogge, Endicott, all of N.Y.

[73] Assignee: International Business Machines Corporation, Armonk, N.Y.

[21] Appl. No.: 458,859

[22] Filed: Jun. 1, 1995

Related U.S. Application Data

[63] Continuation of Ser. No. 887,456, May 22, 1992, abandoned, which is a continuation-in-part of Ser. No. 611,594, Nov. 13, 1990, abandoned, and a continuation of Ser. No. 887,456, May 22, 1992, which is a continuation-in-part of Ser. No. 798,788, Nov. 27, 1991, Pat. No. 5,475,856.

[51] Int. Cl.⁶ ...................................................... G06F 15/80
[52] U.S. Cl. .............................. 395/800.22; 395/200.68; 395/800.11
[58] Field of Search ........................... 395/800, 800.11, 395/200.68, 800.22; 364/DIG. 1, DIG. 2

[56] References Cited

U.S. PATENT DOCUMENTS

| | | | |
|---|---|---|---|
| 3,537,074 | 10/1970 | Stokes et al. | 340/172 |
| 3,544,973 | 12/1970 | Borck et al. | 340/172.5 |
| 3,970,993 | 7/1976 | Finnila | 395/800.14 |
| 4,101,960 | 7/1978 | Stokes et al. | 364/200 |
| 4,107,773 | 8/1978 | Gilbreath et al. | 364/200 |
| 4,270,170 | 5/1981 | Reddaway | 364/200 |
| 4,314,349 | 2/1982 | Batcher | 364/716 |
| 4,338,675 | 7/1982 | Palmer et al. | 364/748 |
| 4,380,046 | 4/1983 | Fung | 364/200 |
| 4,394,726 | 7/1983 | Kohl | 364/200 |
| 4,412,303 | 10/1983 | Barnes et al. | 364/900 |
| 4,435,758 | 3/1984 | Lorie et al. | 364/200 |
| 4,467,422 | 8/1984 | Hunt | 364/200 |

(List continued on next page.)

FOREIGN PATENT DOCUMENTS

| | | |
|---|---|---|
| 0132926 | 2/1985 | European Pat. Off. . |
| 0208497 | 6/1986 | European Pat. Off. . |
| 208457A2 | 6/1986 | European Pat. Off. . |
| 340668A2 | 4/1989 | European Pat. Off. . |
| 428327A1 | 11/1990 | European Pat. Off. . |
| 429733A2 | 6/1991 | European Pat. Off. . |

(List continued on next page.)

OTHER PUBLICATIONS

Sunwoo et al., "A Sliding . . . Array Processor", IEEE, 1988 pp. 537–540.

Siegel et al., "Using the Multistage . . . In Parallel Supercomputers," IEEE, 1989, pp. 1932–1953.

T.A. Kriz and M.J. Marple, "Multi–Port Bus Structure With Fast Shared Memory", IBM Technical Disclosure Bulletin, vol. 27, No. 10A, pp. 5579–5580, Mar. 1985.

H.P. Bakoglu, "Second–Level Shared Cache Implementation for Multiprocessor Computers with a Common Interface for the Second–Level Shared Cache and the Second–Level Private Cache", IBM Technical Disclosure Bulletin, vol. 33, No. 11, pp. 362–365, Apr. 1991.

(List continued on next page.)

*Primary Examiner*—Alyssa H. Bowler
*Assistant Examiner*—John A. Follansbee
*Attorney, Agent, or Firm*—Lynn Augspurger; Morgan & Finnegan, L.L.P.

[57] ABSTRACT

In arrays of processors, especially linear arrays, it is important to be able to communicate to adjacent neighbors (en masse). That is, each element of the array can communicate with its neighbor on the left simultaneously. In addition, the array processor is provided with the ability for selected elements of the array, picket processing elements, to simultaneously communicate with other elements that are further away in one dimension than the nearest neighbor in one transfer cycle. This is accomplished by causing intermediate elements to become transparent in the communication paths, thus allowing data to "slide" through intermediate nodes to the destination node. This system can be used in the implementation of fault tolerance in the array of elements.

18 Claims, 2 Drawing Sheets

U.S. PATENT DOCUMENTS

| | | | |
|---|---|---|---|
| 4,468,727 | 8/1984 | Carrison | 364/200 |
| 4,498,133 | 2/1985 | Bolton et al. | 364/200 |
| 4,523,273 | 6/1985 | Adams, III et al. | 364/200 |
| 4,598,400 | 7/1986 | Hillis | 370/60 |
| 4,604,695 | 8/1986 | Widen et al. | 364/200 |
| 4,621,339 | 11/1986 | Wagner et al. | 364/200 |
| 4,622,650 | 11/1986 | Kulisch | 364/748 |
| 4,706,191 | 11/1987 | Hamstra et al. | 364/200 |
| 4,720,780 | 1/1988 | Dolecek | 364/200 |
| 4,736,291 | 4/1988 | Jennings et al. | 364/200 |
| 4,739,474 | 4/1988 | Holsztynski | 364/200 |
| 4,739,476 | 4/1988 | Fiduccia | 364/200 |
| 4,748,585 | 5/1988 | Chiarulli | 364/900 |
| 4,763,321 | 8/1988 | Calvignac et al. | 370/94 |
| 4,780,873 | 10/1988 | Mattheyses | 370/94 |
| 4,783,738 | 11/1988 | Li et al. | 364/200 |
| 4,783,782 | 11/1988 | Morton | 371/11 |
| 4,805,091 | 2/1989 | Thiel et al. | 364/200 |
| 4,809,159 | 2/1989 | Sowa | 364/200 |
| 4,809,169 | 2/1989 | Sfarti et al. | 364/200 |
| 4,809,347 | 2/1989 | Nash et al. | 382/49 |
| 4,814,980 | 3/1989 | Peterson et al. | 364/200 |
| 4,825,359 | 4/1989 | Ohkami et al. | 364/200 |
| 4,831,519 | 5/1989 | Morton | 364/200 |
| 4,835,729 | 5/1989 | Morton | 364/200 |
| 4,841,476 | 6/1989 | Mitchell et al. | 364/900 |
| 4,847,755 | 7/1989 | Morrison et al. | 364/200 |
| 4,849,882 | 7/1989 | Aoyama et al. | 364/200 |
| 4,852,048 | 7/1989 | Morton | 364/200 |
| 4,855,903 | 8/1989 | Carleton et al. | 364/200 |
| 4,858,110 | 8/1989 | Miyata | 364/200 |
| 4,860,201 | 8/1989 | Stolfo et al. | 364/200 |
| 4,872,133 | 10/1989 | Leeland | 364/748 |
| 4,873,626 | 10/1989 | Gifford | 364/200 |
| 4,891,787 | 1/1990 | Gifford | 364/900 |
| 4,896,265 | 1/1990 | Fiduccia et al. | 364/200 |
| 4,901,224 | 2/1990 | Ewert | 364/200 |
| 4,903,260 | 2/1990 | Boettle et al. | 370/60 |
| 4,905,143 | 2/1990 | Takahashi et al. | 364/200 |
| 4,907,148 | 3/1990 | Morton | 364/200 |
| 4,910,665 | 3/1990 | Mattheyses et al. | 364/200 |
| 4,916,652 | 4/1990 | Schwarz | 364/748 |
| 4,916,657 | 4/1990 | Morton | 364/900 |
| 4,920,484 | 4/1990 | Ranade | 364/200 |
| 4,922,408 | 5/1990 | Davis et al. | 364/200 |
| 4,925,311 | 5/1990 | Neches et al. | 364/200 |
| 4,933,846 | 6/1990 | Humphrey et al. | 364/200 |
| 4,933,895 | 6/1990 | Grinberg et al. | 364/748 |
| 4,942,516 | 7/1990 | Hyatt | 364/200 |
| 4,942,517 | 7/1990 | Cok | 364/200 |
| 4,942,912 | 7/1990 | Aoyma et al. | 364/200 |
| 4,956,772 | 9/1990 | Neches | 364/200 |
| 4,958,273 | 9/1990 | Anderson et al. | 364/200 |
| 4,964,032 | 10/1990 | Smith | 364/200 |
| 4,967,340 | 10/1990 | Dawes | 364/200 |
| 4,975,834 | 12/1990 | Xu et al. | 364/200 |
| 4,985,832 | 1/1991 | Grondalski | 364/200 |
| 4,992,926 | 2/1991 | Janke et al. | 364/134 |
| 4,992,933 | 2/1991 | Taylor | 364/200 |
| 5,005,120 | 4/1991 | Ruetz | 364/200 |
| 5,006,978 | 4/1991 | Neches | 364/200 |
| 5,008,815 | 4/1991 | Hillis | 364/200 |
| 5,008,882 | 4/1991 | Peterson et al. | 370/94.3 |
| 5,010,477 | 4/1991 | Omoda et al. | 364/200 |
| 5,016,163 | 5/1991 | Jesshope et al. | 364/200 |
| 5,020,059 | 5/1991 | Gorin et al. | 371/11.3 |
| 5,021,945 | 6/1991 | Morrison et al. | 364/200 |
| 5,038,282 | 8/1991 | Gilbert et al. | 364/200 |
| 5,038,386 | 8/1991 | Li | 382/302 |
| 5,041,189 | 8/1991 | Tamitani | 364/501 |
| 5,041,971 | 8/1991 | Carvey et al. | 364/200 |
| 5,045,995 | 9/1991 | Levinthal et al. | 364/200 |
| 5,047,917 | 9/1991 | Athas et al. | 364/200 |
| 5,049,982 | 9/1991 | Lee et al. | 357/81 |
| 5,056,000 | 10/1991 | Chang | 364/200 |
| 5,072,217 | 12/1991 | Georgiou et al. | 340/825.79 |
| 5,113,523 | 5/1992 | Colley et al. | 395/800 |
| 5,121,498 | 6/1992 | Gilbert et al. | 395/700 |
| 5,136,582 | 8/1992 | Firoozmand | 370/85.1 |
| 5,142,540 | 8/1992 | Glasser | 371/40.1 |
| 5,146,608 | 9/1992 | Hillis | 395/800 |
| 5,165,023 | 11/1992 | Gifford | 395/325 |
| 5,170,482 | 12/1992 | Shu et al. | 395/800 |
| 5,170,484 | 12/1992 | Gorodalski | 395/800 |
| 5,173,947 | 12/1992 | Chande et al. | 382/41 |
| 5,175,862 | 12/1992 | Phelps et al. | 395/800 |
| 5,175,865 | 12/1992 | Hillis | 395/800 |
| 5,181,017 | 1/1993 | Frey, Jr. et al. | 340/825.02 |
| 5,187,801 | 2/1993 | Zenios et al. | 395/800 |
| 5,189,665 | 2/1993 | Niehaus et al. | 370/458.1 |
| 5,197,130 | 3/1993 | Chen et al. | 395/325 |
| 5,212,773 | 5/1993 | Hillis | 395/200 |
| 5,212,777 | 5/1993 | Gove et al. | 395/375 |
| 5,218,676 | 6/1993 | Ben-Ayed et al. | 395/200 |
| 5,218,709 | 6/1993 | Fijany et al. | 395/800 |
| 5,230,079 | 7/1993 | Grondalski | 395/800 |
| 5,239,629 | 8/1993 | Miller et al. | 395/325 |
| 5,239,654 | 8/1993 | Ing-Simmons et al. | 395/800 |
| 5,251,097 | 10/1993 | Simmons et al. | 361/687 |
| 5,253,359 | 10/1993 | Spix et al. | 395/575 |
| 5,265,124 | 11/1993 | Staab et al. | 375/3 |
| 5,280,474 | 1/1994 | Nickolls et al. | 370/60 |
| 5,297,260 | 3/1994 | Kametani | 395/325 |
| 5,355,508 | 10/1994 | Kan | 395/800 |
| 5,367,636 | 11/1994 | Colley et al. | 395/200 |

FOREIGN PATENT DOCUMENTS

| | | |
|---|---|---|
| 460599A3 | 12/1991 | European Pat. Off. . |
| 0485690 | 5/1992 | European Pat. Off. . |
| 485690A2 | 5/1992 | European Pat. Off. . |
| 493876A2 | 7/1992 | European Pat. Off. . |
| 2223867 | 4/1990 | United Kingdom . |
| 89/09967 | 4/1988 | WIPO . |
| 92/06436 | 4/1992 | WIPO . |

OTHER PUBLICATIONS

Mansingh et al., "System Level Air Flow Analysis for a Computer System Processing Unit", *Hewlett–Packard Journal*, vol. 41 No. 5, Oct. 1990, pp. 82–87.

Tewksbury et al., "Communication Network Issues and High–Density Interconnects in Large–Scale Distributed Computing Systems", *IEEE Journal on Selected Areas in Communication*, vol. 6 No. 3, Apr. 1988, pp. 587–607.

Boubekeur et al., "Configuring a Wafer–Scale Two–Dimensional Array of Single–Bit Processors", Computer, vol. 2, Issue 4, Apr. 1992, pp. 29–39.

Korpiharju et al., "TUTCA Configurable Logic Cell Array Architecture" IEEE, Sep. 1991, pp. 3–3.1–3–3.4.

C.K. Baru and S.Y.W. Su, "The Architecture of SM3: A Dynamically Partionable Multicomputer System", IEEE Transactions on Computers, vol. C–35, No. 9, pp. 790–802, Sep. 1986.

S.P. Booth et al., "Evaluation of the Meiko Computing Surface for HEP Fortran Farming*", Computer Physics Communications 57, pp. 486–491, 1989.

S.P. Booth et al., "Large Scale Applications of Transputers in HEP: The Edinburgh Concurrent Supercomputer Project", Computer Physics Communications 57, pp. 101–107, 1989.

P. Christy, "Software to Support Massively Parallel Computing on the MasPar MP–1", 1990 IEEE, pp. 29–33.

S.R. Colley, "Parallel Solutions to Parallel Problems", Research & Development, pp. 42–45, Nov. 21, 1989.

J.R. Nickolls, "The Design of the MasPar MP–1: A Cost Effective Massivley Parallel Computer", 1990 IEEE, pp. 25–28.

J.F. Prins and J.A. Smith, "Parallel Sorting of Large Arrays on the Maspar MP–1*, The 3rd Symposium on the Frontiers of Massively Parallel Compulation", pp. 59–64, Oct., 1990.

J.B. Rosenberg and J.D. Becher, "Mapping Massive SIMD Parallelism onto Vector Architecture for Stimulation", Software–Practice and Experience, vol. 19(8), pp. 739–756, Aug. 1989.

J.C. Tilton, "Porting an Interative Parallel Region Growing Algorithm from the MPP to the MasPar MP–1", The 3rd Symposium on the Frontiers of Massively Parallel Computation, pp. 170–173, Oct. 1990.

"Sequent Computer Systems Balance and Symmetry Series", Faulkner Technical Reports, Inc., pp. 1–6, Jan. 1988.

"Symmetry 2000/400 and 2000/700 with the DYNIX/ptx Operation System", Sequent Computer Systems Inc.

"Symmetry 2000 Systems—Foundation for Information Advantage", Sequent Computer Systems Inc.

"Our Customers Have Something That Gives Them an Unfair Advantage", The nCUBE Parallel Software Enviroment, nCUBE Corporation.

Y.M. Leung, "Parallel Technology Mapping with Identification of Cells for Dynamic Cell Generation", Dissertation, Syracuse University, May 1992.

"The Connection Machine CM–5 Technical Summary", Thinking Machines Corporation, Oct. 1991.

Fineberg et al., "Experimental Analysis of a Mixed–Mode Parallel Architecture Using Bitonic Sequence Sorting", *Journal of Parallel and Distributed Computing*, Mar. 1991, pp. 239–251.

T. Bridges, "The GPA Machine: A Generally Partitionable MSIMD Architecture", The 3rd Symposium on the Frontiers of Massively Parallel Computation, Oct. 1990, pp. 196–203.

Abreu et al., "The APx Accelerator", The 2nd Symposium on the Frontiers of Massively Parallel Computation, Oct. 1988, pp. 413–417.

D.A. Nicole, "Esprit Project 1085 Reconfigurable Transputer Processor Architecture", CONPAR 88 Additional Papers, Sep. 1988, pp. 12–39.

E. DeBenedicits and J.M. del Rosario, "nCUBE Parallel I/O Software", IPCCC '92, 1992 IEEE, pp. 0117–0124.

T.H. Dunigan, Hypercube Clock Synchronization:. Concurrency: Practice and Experience, vol. 4(3), pp. 257–268, May 1992.

T.H. Dunigan, "Performance of the Intel iPSC/860 and Ncube 6400 hypercubes*", Parallel Computing 17, pp. 1285–1302, 1991.

D.D. Gajski and J.K. Peir, "Essential Issues in Multiprocessor Systems", 1985 IEEE, pp. 9–27, Jun. 1985.

A, Holman, "The Meiko Computing Surface: A Parallel & Scalable Open Systems Platform for Oracle", A Study of a Parallel Database Machine and its Performance—The NCR/Teradata DBC/1012, pp. 96–114.

Baba et al., "A Parallel Object–Oriented Total Architecture: A–NET", Proceedings Supercomputing, Nov. 1990, pp. 276–285.

Mitchell et al., "Architectural Description of a New, Easily Expandable Self–Routing Computer Network Topology", IEEE INFOCOM, Apr. 1989, pp. 981–988.

K. Padmanabhan, "Hierarchical Communication in Cube–Connected Multiprocessors", The 10th International Conference on Distributed Computing Systems, May 1990, pp. 270–277.

Fineberg et al., "Experimental Analysis of Communications/Data–Conditional Aspects of a Mixed–Mode Parallel Architecture via Synthetic Computations", *Proceeding Supercomputing '90*, Nov. 1990, pp. 647–646.

Kan et al., "Parallel Processing on the CAP: Cellular Array Processor", *COMPCON 84*, 16 Sep. 1984, pp. 239–244.

Ezzedine et al., "A 16–bit Specialized Processor Design", *Integration The VLSI Journal*, vol. 6 No. 1, May 1988, pp. 101–110.

A. Mudow, "High Speed Scientific Arithemetic Using a High Performance Sequencer", *ELECTRO*, vol. 6, No. 11, 1986, pp. 1–5.

Alleyne et al., "A Bit–Parallel, Word–Parallel, Massively Parallel Accociative Processor for Scientific Computing", *Third Symposium on the Frontiers of Massive Parallel Computation*, Oct. 8–10, 1990; pp. 176–185.

Jesshoppe et al., "Design of SIMD Microprocessor Array", *IEEE Proceedings*, vol. 136., May 1989, pp. 197–204.

DeGroot et al., "Image Processing using the Sprint Multiprocessor", *IEEE*, 1989, pp. 173–176.

Nudd et al., "An Hetereogeneous M–SIMD Architecture for Kalman Filter Controlled Processing of Image Sequences", *IEEE* 1992, pp. 842–845.

Li et al., "Polmorphic–Torus Network", IEEE Transactions on Computers, vol. 38, No. 9, Sep. 1989 pp. 1345–1351.

Li et al., "Sparse Matrix Vector Multiplication of Polymorphic–Torus", IBM Technical Disclosure Bulletin, vol. 32, No. 3A, Aug. 1989, pp. 233–238.

Li et al., "Parallel Local Operator Engine and Fast P300", IBM Tech. Disc. Bulletin, vol. 32, No. 8B, Jan. 1990, pp. 295–300.

R. Duncan, "A Survey of Parallel Computer Architectures", IEEE, Feb. 90' pp. 5–16.

C.R. Jesshope et al., "Design of SIMID Microprocessor Array", UMI Article Clearing house, Nov. 88'.

Sener Ilgen & Issac Schers, "Parallel Processing on VLSI Associative Memory", NSF Award #ECS–8404627, pp. 50–53.

H. Stone, "Introduction to Computer Architecture", Science Research Associates, 1975, Ch. 8, pp. 318–374.

R. M. lea, "WASP: A WSI Associative String Processor" Journal of VLSI Signal Processing, May 1991, No. 4, pp. 271–285.

Lea, R.M., "ASP Modules: Cost–Effective Building–Blocks for Real–Time DSP Systems", Journal of VLSI Processing, vol. 1, No. 1, Aug. 1989, pp. 69–84.

Isaac D. Scherson, et al., "Bit Parallel Arithmetic in a Massively–Parallel Associative Processor", IEEE, vol. 41, No. 10, Oct. 1992.

Supreet Singh and Jia–Yuan Han, "Systolic arrays", IEEE Feb. 1991.

H. Richter and G. Raupp, "Control of a Tokamak Fusion Esperiment by a Set of MULTITOP Parallel Computers", IEEE vol. 39, 1992, pp. 192–197.

Higuchi et al., "IXM2: A Parallel Associative Processor for Semanitc Net Processing—Preliminary Evaluation—", IEEE, Jun. 1990, pp. 667–673.

Frison et al., "Designing Specific Systolic Arrays with the AP115C Chip", IEEE 1990, xii+808pp., pp. 505–517.

Berg et al.,"Instruction Execution Trade-Offs for SIMD vs. MIMD vs. Mixed Mode Parallelism", IEEE Feb. 1991, pp. 301–308.

Raghaven et al., "Fine Grain Parallel Processors and Real-Time Applications: MIMD Controller/SIMD Array", IEEE, May 1990, pp. 324–331.

G. J. Lipovski, "SIMD and MIMD Processing in the Texas Reconfigurable Array Computer", Feb. 1988, pp. 268–271.

R.M. Lea, "ASP: A Cost-effective Parallel Microcomputer", IEEE Oct. 1988, pp. 10–29.

Mark A. Nichols, "Data Management and Control-flow Constructs in a SIMD/SPMD Parallel Language/Compiler", IEEE, Feb. 1990, pp. 397–406.

Will R. Moore, "VLSI for Artificial Intelligence", Kluwer Academic Publishers, Ch. 4.1.

Mosher et al., "A Software for Image Processing on a Medium–Grain Parallel Machine", SPIE vol. 1659 Image Processing and Interchange, 1992/279.

*Patent Abstracts of Japan*, vol. 8, No. 105, 17 May 1984, p. 274. App. No. JP–820 125 341 (Tokyo Shibaura Denki KK) 27 Jan. 1984.

W.D. Hillitis, *"The Connection Machine"*, The MIT Press, Chapters 1, 3, and 4.

"Joho–syori", vol. 26(3), 1985–3, pp. 213–225, (Japanese).

Journal of VLSI Signal Processing, May 1991, No. 4, pp. 271–285, "WASP: A WSI Associative String Processor", by Lea.

SLIDE NETWORK FOR AN ARRAY PROCESSOR

CROSS REFERENCE TO RELATED APPLICATIONS

The present application is a continuation of Ser. No. 07/887,456, filed May 22, 1992, now abandoned, which is a continuation-in-part of application Ser. No. 07/611,594 filed Nov. 13, 1990, of J. Dieffenderfer et al., entitled "Parallel Associative Processor System", now abandoned; and a continuation of Ser. No. 07/887,456 filed May 22, 1992, now abandoned which is a continuation-in-part of U.S. Pat. No. 5,475,856 of P. Kogge entitled "Dynamic Multi-Mode Parallel Processor Array" which issued Dec. 12, 1995, of application Ser. No. 07/798,788, filed Nov. 27, 1991.

In addition, this application is related to the following applications filed concurrently herewith:

U.S. patent application Ser. No. 08/558,763 filed Nov. 15, 1995, now abandoned, which is a continuation of application Ser. No. 08/356,039 filed Dec. 14, 1994, now abandoned, which was a continuation of application Ser. No. 08/274,127 filed Jul. 12, 1994, now abandoned, which was a continuation of application Ser. No. 07/887,718 filed May 22, 1992, now abandoned, of P. Wilkinson et al., entitled "SIMIMD Array Processing System";

U.S. patent application Ser. No. 08/460,515 filed Jun. 1, 1995, which is a continuation of application Ser. No. 07/887,514 filed May 22, 1992, of P. Wilkinson et al., entitled "Floating Point For A SIMD Array Machine", now abandoned;

U.S. patent application Ser. No. 08/431,617 filed May 1, 1995, now abandoned, which is a continuation of application Ser. No. 07/887,455 filed May 22, 1992, of P. Wilkinson et al., entitled "Array Processor Having Grouping of SIMD Pickets", now abandoned;

U.S. patent application Ser. No. 08/430,931 filed Jun. 7, 1995, which is a continuation of application Ser. No. 07/887,256 filed May 22, 1992, of P. Wilkinson et al., entitled "Picket Autonomy On A SIMD Machine", now abandoned;

U.S. patent application Ser. No. 08/292,943 filed Aug. 18, 1994, which is a continuation of application Ser. No. 07/887,459 filed May 22, 1992, of P. Wilkinson et al., entitled "Controller For A SIMD/MIMD Processor Array", now abandoned; and U.S. patent application Ser. No. 08/430,708 filed Apr. 27, 1995, now U.S. Pat. No. 5,630,162 which is a continuation of application Ser. No. 07/887,997 filed May 22, 1992, of P. Wilkinson et al., entitled "Array Processor Dotted Communication Network Based On H-DOTS", now abandoned.

Further this application is related to:

U.S. patent application Ser. No. 07/887,630 filed May 22, 1992, of T. Barker, et al., entitled "Advanced Parallel Array Processor", now U.S. Pat. No. 5,590,345;

U.S. patent application Ser. No. 08/459,374 filed Jun. 2, 1995, now U.S. Pat. No. 5,625,831 which is a continuation of application Ser. No. 07/888,000 filed May 22, 1992, of T. Barker, entitled "SIMD/MIMD Processing Memory Element", now abandoned;

U.S. patent application Ser. No. 08/459,380 filed Jun. 2, 1995, now abandoned, which is a continuation of application Ser. No. 07/993,255 filed Dec. 18, 1992, of T. Barker, entitled "PME Store and Forward/Circuit Switched Mode", now abandoned;

U.S. patent application Ser. No. 08/468,500 filed Jun. 6, 1995, which is a continuation of application Ser. No. 07/887,508 filed May 22, 1992, of T. Barker, entitled "Fully Distributed Processing Memory Element", now abandoned;

U.S. patent application Ser. No. 08/519,859 filed Aug. 25, 1995, now U.S. Pat. No. 5,588,152, which is a continuation of application Ser. No. 08/380,230 filed Jan. 30, 1995, now abandoned, which was a continuation of application Ser. No. 07/877,612 filed May 22, 1992, of M. Dapp, et al., entitled "Advanced Parallel Processor Including Advanced Support Hardware", now abandoned;

U.S. patent application Ser. No. 08/412,025 filed Mar. 28, 1995, now abandoned which is a continuation of application Ser. No. 07/587,512 filed May 22, 1992, of M. Dapp, et al., entitled "Advanced Parallel Array Processor Computer Package", now U.S. Pat. No. 5,060,198;

U.S. patent application Ser. No. 08/282,101 filed Jul. 28, 1994, now abandoned, which is a continuation of application Ser. No. 07/888,684 filed May 22, 1992, of T. Barker, et al., entitled "N-Dimensional Modified Hypercube", now abandoned; and U.S. patent application Ser. No. 08/430,114 filed Apr. 27, 1995, which is a continuation of application Ser. No. 07/887,258 filed May 22, 1992, of M. Dapp, et al., entitled "APAP I/O Programmable Router", now abandoned.

U.S. patent application Ser. No. 08/400,687 filed Mar. 8, 1995, now U.S. Pat. No. 5,617,577, which is a continuation of U.S. patent application Ser. No. 07/887,259 filed May 22, 1992, of T. Barker et al. entitled "APAP I/O Zipper Connection", now abandoned.

These co-pending applications and the present application are owned by one and the same assignee, International Business Machines Corporation of Armonk, New York. The descriptions set forth in these co-pending applications are incorporated into the present application by reference.

CROSS REFERENCE TO OTHER PATENTS AND CO-PENDING PATENT APPLICATIONS

Other commonly owned Patents also assigned to the same assignee as the present application and co-pending at the time of filing include:

U.S. Pat. No. 4,992,993 of J. Taylor entitled "SIMD Array Processor With Global Instruction Control And Reprogrammable Instruction Decoders" which issued Feb. 12, 1991;

U.S. Pat. No. 5,257,395 of H. Li entitled "Methods And Circuit For Implementing An Arbitrary Graph On A Polymorphic Mesh" which issued Oct. 26, 1993;

U.S. Pat. No. 5,410,727 of R. Jaffe et al. entitled "Input/Output System For A Massively Parallel, Single Instruction, Multiple Data (SIMD) Computer Providing For The Simultaneous Transfer Of Data Between A Host Computer Input/Output System And All SIMD Memory Devices" which issued on Apr. 25, 1995;

U.S. Pat. No. 5,457,789 of W. Dietrich, Jr. et al. entitled "Method And Apparatus For Performing Memory Protection Operations In A Single Instruction, Multiple Data System" which issued Oct. 10, 1995; and U.S. Pat. No. 5,313,645 of D. Rolfe entitled "Method For Interconnecting And System Of Interconnected Processing Elements By Controlling Network Density" which issued May 17, 1994.

All above referenced co-pending applications are also are owned by one and the same assignee, namely, International Business Machines Corporation of Armonk, New York. The descriptions set forth in these co-pending applications are also incorporated by reference.

CROSS REFERENCE TO OTHER CO-PENDING PATENT APPLICATIONS

Other commonly owned Co-Pending Applications also assigned to the same assignee as the present application at the time of filing include:

U.S. patent application Ser. No. 07/250,595, filed Sep. 27, 1988, now abandoned in favor of its continuation application Ser. No. 07/519,332, filed May 4, 1990 of James L. Taylor entitled "SIMD Array Processor" (which was originally published as EPO Application Ser. No. 88307855/88-A on May 3, 1989, now U.S. Pat. No. 4,992,933); and U.S. patent application Ser. No. 07/193,990, filed May 13, 1988, of H. Li, entitled "Methods and Circuit for Implementing an Arbitrary Graph on a Polymorphic Mesh", now abandoned; and U.S. patent application Ser. No. 07/426,140, filed Oct. 24, 1989, of R. Jaffe et al entitled "Two-Dimensional Input/ Output Scheme for Massively Parallel SIMD Computers", now abandoned; and U.S. patent application Ser. No. 07/439,758, filed Nov. 21, 1989, of W. C. Dietrich, Jr. et al entitled "Method and Apparatus for Performing Memory Protection Operations in a Parallel Processor System", now abandoned; and U.S. patent application Ser. No. 07/698,866, filed May 13, 1991, of David B. Rolfe, entitled "Method for Interconnecting and System of Interconnected Processing Elements", now U.S. Pat. No. 5,313,645.

All above referenced co-pending applications are also are owned by one and the same assignee, namely, International Business Machines Corporation of Armonk, New York.

The descriptions set forth in these co-pending applications are also incorporated by reference.

FIELD OF THE INVENTION

These invention relate to computers and computer systems and particularly to arrays of processors and more particularly to a slide network for array processors enabling passing information from one processing element which slides past intermediate processing elements in the network to reach a destination processing element that may not be a neighbor. The network data path in our preferred embodiment is parallel, not a bit-serial data path.

GLOSSARY OF TERMS

ALU

ALU is the arithmetic logic unit portion of a processor.

Array

Array refers to an arrangement of elements in one or more dimensions. An array can include an ordered set of data items (array element) which in languages like Fortran are identified by a single name. In other languages such a name of an ordered set of data items refers to an ordered collection or set of data elements, all of which have identical attributes. A program array has dimensions specified, generally by a number or dimension attribute. The declarator of the array may also specify the size of each dimension of the array in some languages. In some languages, an array is an arrangement of elements in a table. In a hardware sense, an array is a collection of structures (functional elements) which are generally identical in a massively parallel architecture. Array elements in data parallel computing are elements which can be assigned operations and when parallel can each independently and in parallel execute the operations required. Generally, arrays may be thought of as grids of processing elements. Sections of the array may be assigned sectional data, so that sectional data can be moved around in a regular grid pattern. However, data can be indexed or assigned to an arbitrary location in an array.

Array Director

An Array Director is a unit programmed as a controller for an array. It performs the function of a master controller for a grouping of functional elements arranged in an array.

Array Processor

There two principal types of array processors—multiple instruction multiple data (MIMD) and single instruction multiple data (SIMD). In a MIMD array processor, each processing element in the array executes its own unique instruction stream with its own data. In a SIMD array processor, each processing element in the array is restricted to the same instruction via a common instruction stream; however, the data associated with each processing element is unique. Our preferred array processor has other characteristics. We call it Advanced Parallel Array Processor, and use the acronym APAP.

Asynchronous

Asynchronous is without a regular time relationship; the execution of a function is unpredictable with respect to the execution of other functions which occur without a regular or predictable time relationship to other function executions. In control situations, a controller will address a location to which control is passed when data is waiting for an idle element being addressed. This permits operations to remain in a sequence while they are out of time coincidence with any event.

BOPS/GOPS

BOPS or GOPS are acronyms having the same meaning—billions of operations per second. See GOPS.

Circuit Switched/Store Forward

These terms refer to two mechanisms for moving data packets through a network of nodes. Store Forward is a mechanism whereby a data packet is received by each intermediate node, stored into its memory, and then forwarded on towards its destination. Circuit Switch is a mechanism whereby an intermediate node is commanded to logically connect its input port to an output port such that data packets can pass directly through the node towards their destination, without entering the intermediate node's memory.

Cluster

A cluster is a station (or functional unit) which consists of a control unit (cluster controller) and the hardware (which may be terminals, functional units, or virtual components) attached to it. Our Cluster includes an array of PMEs sometimes called a Node array. Usually a cluster has 512 PMEs. Our Entire PME node array consists of a set of clusters, each cluster supported by a cluster controller (CC).

Cluster controller

A cluster controller is a device that controls input/output (I/O) operations for more than one device or functional unit connected to it. A cluster controller is usually controlled by a program stored and executed in the unit as it was in the IBM 3601 Finance Communication Controller, but it can be entirely controlled by hardware as it was in the IBM 3272 Control Unit.

Cluster synchronizer

A cluster synchronizer is a functional unit which manages the operations of all or part of a cluster to maintain synchronous operation of the elements so that the functional units maintain a particular time relationship with the execution of a program.

Controller

A controller is a device that directs the transmission of data and instructions over the links of an interconnection network; its operation is controlled by a program executed by a processor to which the controller is connected or by a program executed within the device.

CMOS

CMOS is an acronym for Complementary Metal-Oxide Semiconductor technology. It is commonly used to manufacture dynamic random access memories (DRAMs). NMOS is another technology used to manufacture DRAMS. We prefer CMOS but the technology used to manufacture the APAP is not intended to limit the scope of the semiconductor technology which is employed.

Dotting

Dotting refers to the joining of three or more leads by physically connecting them together. Most backpanel busses share this connection approach. The term relates to OR DOTS of times past but is used here to identify multiple data sources that can be combined onto a bus by a very simple protocol.

Our I/O zipper concept can be used to implement the concept that the port into a node could be driven by the port out of a node or by data coming from the system bus. Conversely, data being put out of a node would be available to both the input to another node and to the system bus. Note that outputting data to both the system bus and another node is not done simultaneously but in different cycles.

Dotting is used in the H-DOT discussions where Two-ported PEs or PMEs or Pickets can be used in arrays of various organizations by taking advantage of dotting. Several topologies are discussed including 2D and 3D Meshes, Base 2 N-cube, Sparse Base 4 N-cube, and Sparse Base 8 N-cube.

DRAM

DRAM is an acronym for dynamic random access memory, the common storage used by computers for main memory. However, the term DRAM can be applied to use as a cache or as a memory which is not the main memory.

FLOATING-POINT

A floating-point number is expressed in two parts. There is a fixed point or fraction part, and an exponent part to some assumed radix or Base. The exponent indicates the actual placement of the decimal point. In the typical floating-point representation a real number 0.0001234 is represented as 0.1234-3, where 0.1234 is the fixed-point part and -3 is the exponent. In this example, the floating-point radix or base is 10, where 10 represents the implicit fixed positive integer base, greater than unity, that is raised to the power explicitly denoted by the exponent in the floating-point representation or represented by the characteristic in the floating-point representation and then multiplied by the fixed-point part to determine the real number represented. Numeric literals can be expressed in floating-point notation as well as real numbers.

FLOPS

This terms refers to floating-point instructions per second. Floating-point operations include ADD, SUB, MPY, DIV and often many others. Floating-point instructions per second parameter is often calculated using the add or multiply instructions and, in general, may be considered to have a 50/50 mix. An operation includes the generation of exponent, fraction and any required fraction normalization. We could address 32 or 48-bit floating-point formats (or longer but we have not counted them in the mix.) A floating-point operation when implemented with fixed point instructions (normal or RISC) requires multiple instructions. Some use a 10 to 1 ratio in figuring performance while some specific studies have shown a ratio of 6.25 more appropriate to use. Various architectures will have different ratios.

Functional unit

A functional unit is an entity of hardware, software, or both, capable of accomplishing a purpose.

Gbytes

Gbytes refers to a billion bytes. Gbytes/s would be a billion bytes per second.

GIGAFLOPS $(10)^{**}9$ floating-point instructions per second.

GOPSand PETAOPS

GOPS or BOPS, have the same meaning—billions of operations per second. PETAOPS means trillions of operations per second, a potential of the current machine. For our APAP machine they are just about the same as BIPs/GIPs meaning billions of instructions per second. In some machines an instruction can cause two or more operations (ie. both an add and multiply) but we don't do that. Alternatively it could take many instructions to do an op. For example we use multiple instructions to perform 64 bit arithmetic. In counting ops however, we did not elect to count log ops. GOPS may be the preferred use to describe performance, but there is no consistency in usage that has been noted. One sees MIPs/MOPs then BIPs/BOPs and MegaFLOPS/GigaFLOPS/TeraFLOPS/PetaFlops.

ISA

ISA means the Instruction Set Architecture.

Link

A link is an element which may be physical or logical. A physical link is the physical connection for joining elements or units, while in computer programming a link is an instruction or address that passes control and parameters between separate portions of the program. In multisystems a link is the connection between two systems which may be specified by program code identifying the link which may be identified by a real or virtual address. Thus generally a link includes the physical medium, any protocol, and associated devices and programming; it is both logical and physical.

MFLOPS

MFLOPS means $(10)^{**}6$ floating-point instructions per second.

MIMD

MIMD is used to refer to a processor array architecture wherein each processor in the array has its own instruction stream, thus Multiple Instruction stream, to execute Multiple Data streams located one per processing element.

Module

A module is a program unit that is discrete and identifiable or a functional unit of hardware designed for use with other components. Also, a collection of PEs contained in a single electronic chip is called a module.

Node

Generally, a node is the junction of links. In a generic array of PEs, one PE can be a node. A node can also contain a collection of PEs called a module. In accordance with our invention a node is formed of an array of PMEs, and we refer to the set of PMEs as a node. Preferably a node is 8 PMEs.

Node array

A collection of modules made up of PMEs is sometimes referred to as a node array, is an array of nodes made up of modules. A node array is usually more than a few PMEs, but the term encompasses a plurality.

PDE

A PDE is a partial differential equation.

PDE relaxation solution process

PDE relaxation solution process is a way to solve a PDE (partial differential equation). Solving PDEs uses most of the super computing compute power in the known universe and can therefore be a good example of the relaxation process. There are many ways to solve the PDE equation and more than one of the numerical methods includes the relaxation process. For example, if a PDE is solved by finite element methods relaxation consumes the bulk of the computing time. Consider an example from the world of heat transfer. Given hot gas inside a chimney and a cold wind outside, how will the temperature gradient within the chimney bricks develop? By considering the bricks as tiny segments and writing an equation that says how heat flows between segments as a function of temperature differences then the heat transfer PDE has been converted into a finite element problem. If we then say all elements except those on the inside and outside are at room temperature while the boundary segments are at the hot gas and cold wind temperature, we have set up the problem to begin relaxation. The computer program then models time by updating the temperature variable in each segment based upon the amount of heat that flows into or out of the segment. It takes many cycles of processing all the segments in the model before the set of temperature variables across the chimney relaxes to represent actual temperature distribution that would occur in the physical chimney. If the objective was to model gas cooling in the chimney then the elements would have to extend to gas equations, and the boundary conditions on the inside would be linked to another finite element model, and the process continues. Note that the heat flow is dependent upon the temperature difference between the segment and its neighbors. It thus uses the inter-PE communication paths to distribute the temperature variables. It is this near neighbor communication pattern or characteristic that makes PDE relation very applicable to parallel computing.

PICKET

This is the element in an array of elements making up an array processor. It consists of: data flow (ALU REGS), memory, control, and the portion of the communication matrix associated with the element. The unit refers to a 1/nth of an array processor made up of parallel processor and memory elements with their control and portion of the array intercommunication mechanism. A picket is a form of processor memory element or PME. Our PME chip design processor logic can implement the picket logic described in related applications or have the logic for the array of processors formed as a node. The term PICKET is similar to the commonly used array term PE for processing element, and is an element of the processing array preferably comprised of a combined processing element and local memory for processing bit parallel bytes of information in a clock cycle. The preferred embodiment consisting of a byte wide data flow processor, 32k bytes or more of memory, primitive controls and ties to communications with other pickets.

The term "picket" comes from Tom Sawyer and his white fence, although it will also be understood functionally that a military picket line analogy fits quite well.

Picket Chip

A picket chip contains a plurality of pickets on a single silicon chip.

Picket Processor system (or Subsystem)

A picket processor is a total system consisting of an array of pickets, a communication network, an I/O system, and a SIMD controller consisting of a microprocessor, a canned routine processor, and a micro-controller that runs the array.

Picket Architecture

The Picket Architecture is the preferred embodiment for the SIMD architecture with features that accommodate several diverse kinds of problems including:

set associative processing parallel numerically intensive processing physical array processing similar to images

Picket Array

A picket array is a collection of pickets arranged in a geometric order, a regular array.

PME or processor memory element

PME is used for a processor memory element. We use the term PME to refer to a single processor, memory and I/O capable system element or unit that forms one of our parallel array processors. A processor memory element is a term which encompasses a picket. A processor memory element is 1/nth of a processor array which comprises a processor, its associated memory, control interface, and a portion of an array communication network mechanism. This element can have a processor memory element with a connectivity of a regular array, as in a picket processor, or as part of a subarray, as in the multi-processor memory element node we have described.

Routing

Routing is the assignment of a physical path by which a message will reach its destination. Routing assignments have a source or origin and a destination. These elements or addresses have a temporary relationship or affinity. Often, message routing is based upon a key which is obtained by reference to a table of assignments. In a network, a destination is any station or network addressable unit addressed as the destination of information transmitted by a path control address that identifies the link. The destination field identifies the destination with a message header destination code.

SIMD

A processor array architecture wherein all processors in the array are commanded from a Single Instruction stream to execute Multiple Data streams located one per processing element.

SIMDMIMD or SIMD/MIMD

SIMDMIMD or SIMD/MIMD is a term referring to a machine that has a dual function that can switch from MIMD to SIMD for a period of time to handle some complex instruction, and thus has two modes. The Thinking Machines, Inc. Connection Machine model CM-2 when placed as a front end or back end of a MIMD machine permitted programmers to operate different modes for execution of different parts of a problem, referred to sometimes a dual modes. These machines have existed since Illiac and have employed a bus that interconnects the master CPU with other processors. The master control processor would have the capability of interrupting the processing of other CPUs. The other CPUs could run independent program code. During an interruption, some provision must be made for checkpointing (closing and saving current status of the controlled processors).

SIMIMD

SIMIMD is a processor array architecture wherein all processors in the array are commanded from a Single Instruction stream, to execute Multiple Data streams located one per processing element. Within this construct, data dependent operations within each picket that mimic instruction execution are controlled by the SIMD instruction stream.

This is a Single Instruction Stream machine with the ability to sequence Multiple Instruction streams (one per Picket) using the SIMD instruction stream and operate on Multiple Data Streams (one per Picket). SIMIMD can be executed by a processor memory element system.

SISD

SISD is an acronym for Single Instruction Single Data.

Swapping

Swapping interchanges the data content of a storage area with that of another area of storage.

Synchronous Operation

Synchronous operation in a MIMD machine is a mode of operation in which each action is related to an event (usually a clock); it can be a specified event that occurs regularly in a program sequence. An operation is dispatched to a number of PEs who then go off to independently perform the function. Control is not returned to the controller until the operation is completed.

If the request is to an array of functional units, the request is generated by a controller to elements in the array which must complete their operation before control is returned to the controller.

TERAFLOPS

TERAFLOPS means (10)**12 floating-point instructions per second.

VLSI

VLSI is an acronym for very large scale integration (as applied to integrated circuits).

Zipper

A zipper is a new function provided. It allows for links to be made from devices which are external to the normal interconnection of an array configuration.

BACKGROUND OF THE INVENTION

In the never ending quest for faster computers, engineers are linking hundreds, and even thousands of low cost microprocessors together in parallel to create super supercomputers that divide in order to conquer complex problems that stump today's machines. Such machines are called massively parallel. We have created a new way to create massively parallel systems. The many improvements which we have made should be considered against the background of many works of others. A summary of the field has been made in other applications which are referenced. See in this connection the related application for our Parallel Associative Processor System, U.S. Ser. No. 601,594 and our Advanced Parallel Array Processor (APAP). System tradeoffs are required to pick the architecture which best suits a particular application but no single solution has been satisfactory. Our ideas make it easier to provide a solution.

Communication among processing elements in an array of processors is probably the most time consuming part of array problems. Solutions for solving have resulted in many communication architectures.

A simple controller directed mesh provides paths and control so that each element communicates in a NEWS network to neighbors on the North, East, West, and South. Such NEWS networks are popular on SIMD machines used for regular array processing, as with images.

Another traditional communication network solution is the binary N-cube. This network requires a smart router at each node that can examine the header information in a message and decide the appropriate disposition of the message. Application of this approach has typically been in MIMD arrays; however, some SIMD arrays have included the binary N-Cube network routers.

There is a need in SIMD and related processing to isolate processing from communication. This has not had a suitable solution for byte-wide data streams. The other possiblilites, including those which might be suggested by the art discussed here, use too much silicon.

We note that the term "slide" has been used before in the art to describe a mass movement of information to a nearest neighbor only. U.S. Pat. No. 4,380,046 of Frosch, entitled "Massively Parallel Processor Computer," uses the word "slide" in a manner which is not related to our implementation of a structure to which we believe the term should be applied. Instead, U.S. Pat. No. 4,380,046 relates to a large array of bit slice processors suitable for space borne processing of image data. This 1979 patent fully describes a state of the art SIMD processor to the logic elements needed to implement the array and refers to the packaging of four processing elements on a single chip.

The term "sliding" in U.S. Pat. No. 4,380,046 is used in reference to moving data to neighboring processing elements. In FIG. 2 of this patent reference is made to a logic-slider subunit FIG. 11 and FIG. 12 of this patent reference an S-REGISTR (SLIDE COMMAND). There are several other references to the term slide in the patent. In U.S. Pat. No. 4,380,046, the term "slide" refers to the movement of an entire image in one direction for one pixel position. Thus, every processing element takes from its top a pixel of data from the processing element to move the image down one row of pixels. In spite of similarities of problems, this patent does not address problems which are associated with a parallel data path; but, like the SIMD machines in the art, U.S. Pat. No. 4,380,046 instead describes a serial data path.

As will be seen, we use the term "slide" to describe the action in a multibyte-wide parallel data stream situation of passing a piece of information from one picket sliding past intermediate pickets to the destination picket that may not be a neighbor at all. Frosch's patented device has a different use, and the patented device is used to refer to mass movement to nearest neighbor only.

U.S. Pat. No. 4,523,273 of Adams, entitled "Extra Stage Cube," describes an array of computers and a data routing system between them. Apparently, each processor has a data switching box. Each data switching box has four (two input and two output) ports with connectivity to each input to either or both outputs. An additional column of switching boxes is included at the input edge of the resulting array to provide fault tolerance to the generalized cube connected network. While one of the features achieved by our invention provides a desirabile fault tolerance in an array of elements, Adams describes a fault tolerant implementation of the generalized cube interconnection structure for an array of processors. This structure is much more complex than the interconnect structure that we believe is appropriate.

U.S. Pat. No. 4,621,339 of Wagner, relates to "SIMD Machine using Cube Connected Cycles Network Architecture for Vector Processing," taking a SIMD 2-d routing network and implementing it so that it is cube connected and has communication between distant elements in the array to provide an environment where more "interesting" problems can be hosted on a machine with a SIMD organization. Processing elements and data paths are 1-bit wide. The structure has no suggestion of the desireability of a slide structure or the use of multiple byte-wide pickets with connection registers capable of allowing data to slide through them.

U.S. Pat. No. 4,858,110 of Miyata, entitled "Parallel Data Processor with Shift Register Inter-processor Transfer," illustrates inter-processing communication as conceived by Miyata for a conventional SIMD machine. U.S. Pat. No. 4,858,110 implements a communication "Shift Register" with two clocks to improve performance by overlapping processing within the PE with communication between PEs in the 2-d mesh. The first clock on the shift register is used by the PE to shift it. The second clock is used for inter-PE communication. Instead of providing something like our invention, U.S. Pat. No. 4,858,110 uses the shift register for communication between processing elements. This art shows other attempts to provide inter-processing element communication in SIMD machines, but there is a need to isolate processing from communication. These prior solutions in a byte-wide parallel data stream architecture using pickets would use too much silicon.

SUMMARY OF THE INVENTION

Our improvements which achieve communication between elements in a linear or multi-dimensional array processor, such as may have byte-wide parallel data streams with minimal hardware at each node, provide our system with the ability to circumvent certain problems associated with inactive or disabled elements and support communication across more than one element of the array in a single transfer cycle. Our invention enables multiple byte-wide pickets which are provided with connection registers capable of allowing data to slide through them to support interprocessor element communication with minimal hardware and silicon while isolating processing and communication functions.

As a result of our invention we have provided:

a slide bus structure;

a picket addressing organization that (a) supports dozing pickets, and (b) controls of communication using the slide bus.

The arrangement provides a way for each picket of an array processor to communicate with a neighbor to the left or with a neighbor to the right. The approach has applicability for linear and higher order arrays.

In arrays of processors, especially linear arrays, it is important to be able to communicate to adjacent neighbors (en masse) so that each element of the array communicates with its neighbor, e.g. the left, simultaneously. However, in addition, our invention provides system ability for selected elements of the array to simultaneously communicate with other elements that are further away in a dimension other than nearest neighbor in one transfer cycle. This is accomplished by causing intermediate elements to become transparent in the communication paths, thus allowing data to "slide" through intermediate nodes to the destination node. This invention can also be significant in the implementation of fault tolerance in the array of processing elements of an array processor.

We have created a new way to make massively parallel processors and other computer systems by creating a new "chip" and systems designed with our new concepts. This application is directed to such systems. Our here and in the related applications may be viewed of our expression of the various concepts we teach in this application, and in the related applications. Components described in each application can be combined in our systems to make new systems. They also can be combined with existing technology.

We will elaborate in this and related applications Picket Processors and what we call an Advanced Parallel Array Processor (APAP). It may be interesting to note that the picket processor can employ a PME. A picket processor may be especially useful in military application where a very compact array processor is desirable. In this connection, a picket processor differs somewhat from the preferred embodiment associated with the APAP, our Advanced Parallel Array Processor. However, the commonality exists, and aspects and features which we have provided can be employed in differing machines.

The term picket refers to 1/nth element of an array processor made up of processor and memory and their included communication elements applicable for array intercommunication.

The picket concept is also applicable to the 1/nth of an APAP processing array.

While the picket concept can differ from an APAP in data width, memory size, and number of registers, it is, in the massively parallel embodiment which is an alternative to an APAP, different in that it is configured to have connectivity for 1/nth of a regular array, while a PME in an APAP is a part of a sub-array. Both systems can execute SIMIMD. However, because a picket processor is configured as a SIMD machine with MIMD in the PE, it can directly execute SIMIMD, while a MIMD APAP configuration would execute SIMIMD by using MIMD PEs controlled to emulate SIMD. Both machines use a PME.

Both systems can be configured as a parallel array processor, comprising an array processing unit for the array having 'N' elements interconnected with an array communication network wherein 1/Nth of the processor array is a processing element, it's associated memory, a control bus interface, and a portion of the array communication network.

The parallel array processor has a dual operation mode capability wherein the processing unit can be commanded to operate in either or two modes, and freely move between these two modes for SIMD and MIMD operation, where when SIMD is the mode of its organization a processing unit has the ability to command each element to execute it's own instructions in a SIMIMD mode, and where when MIMD is the implementation mode for the processing units organization it has the ability to synchronize selected elements of the array to simulate MIMD execution. We can call this MIMD-SIMD).

A parallel array processor in both systems provides an array communication network with paths for the passing of information between elements of the array. The movement of information can be directed by either of two ways, where as a first way, an array controller directs that all messages move in the same direction at the same time such that the data being moved does not define its destination, and in a second way, each message is self routed with a header at the beginning of a message defining its destination.

A segment of the parallel array processor array has plural copies of the processing unit is provided on a single semiconductor chip, which each copy segment of the array including a portion of the array communication network associated with that segment and buffers, drivers, multiplexers, and control for enabling the segment portion of the array to be seamlessly connected with other segments of the array to extend the array communication network.

The control bus or path from a controller is provided for each processing unit so that the control bus extends to each of the elements of the array and controls its activities.

Each processing element segment of the parallel array, contains plural copies of a processor memory element, which is contained within the limits of a single semiconductor chip, has a segment of the array includes a portion of the array control bus and the register buffers to support the communication of controls to the array segment contained within the chip.

Both can implement mesh moves or routed moves. Normally, the APAP implements a dual interconnect structure, with eight elements on the chip interrelating in one way, while the chips interrelate in another way. The programmable routing on the chip generally causes links to be established between the PMEs as we have described, but the nodes can be and normally are related in another way. On the chip essentially the normal APAP configuration would be a 2×4 mesh, which the node interconnection can be a routed sparse octal N-cube. Both systems have inter-PE intercommunication pathways between PEs (PMEs) enabling a matrix to be made up of point-to-point paths.

With this background and perspective, we will describe in detail features and aspects of our invention related to the preferred embodiment of our invention with reference to the FIGURES.

DETAILED DESCRIPTION OF SLIDE NETWORK FOR ARRAY PROCESSOR

For passing data between pickets in the "Parallel Associative Processor System" illustrated by FIGS. 2–7 of Ser. No. 07/611,594, an arrangement with each picket having the ability to communicate with the neighbor on the left or with the neighbor on the right has been provided. The present preferred embodiment is applicable to this configuration. The approach can be applied to 2-dimensional and higher order arrays.

The proposed implementation includes a multibyte-wide register in each picket as well as a multibyte-wide path to the left and to the right such that all pickets can transfer data to the neighbor on the left or right simultaneously. We call this mechanism the SLIDE BUS.

Figure 1:
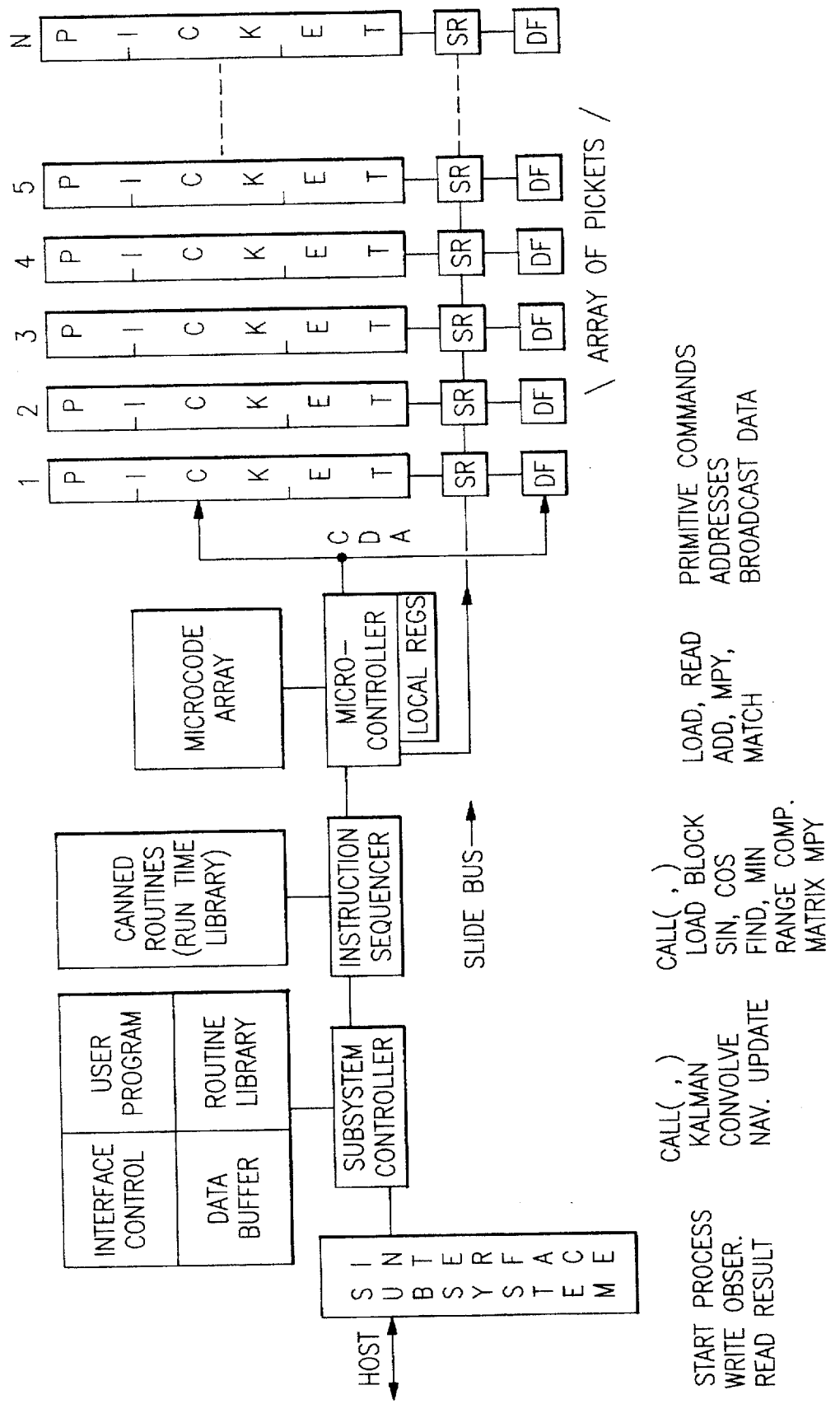
FIG. 1 is an array block diagram which shows a set of pickets with the interconnecting slide bus in accordance with our preferred embodiment for a slide network suitable for an array processor, as exemplified by the "Parallel Associative Array Processor" illustrated by FIGS. 2–7, of U.S. patent application Ser. No. 07/611,594, the parent application.

FIG. 1 shows a set of pickets with the interconnecting slide bus and shows a typical implementation of an array of processing elements including control means and communication paths. The slide register (SR) in each picket can be made transparent such that when data is passed to the picket from the right and it is transparent, the data slides through the picket to the picket on the left in the same clock cycle.

Figure 2:
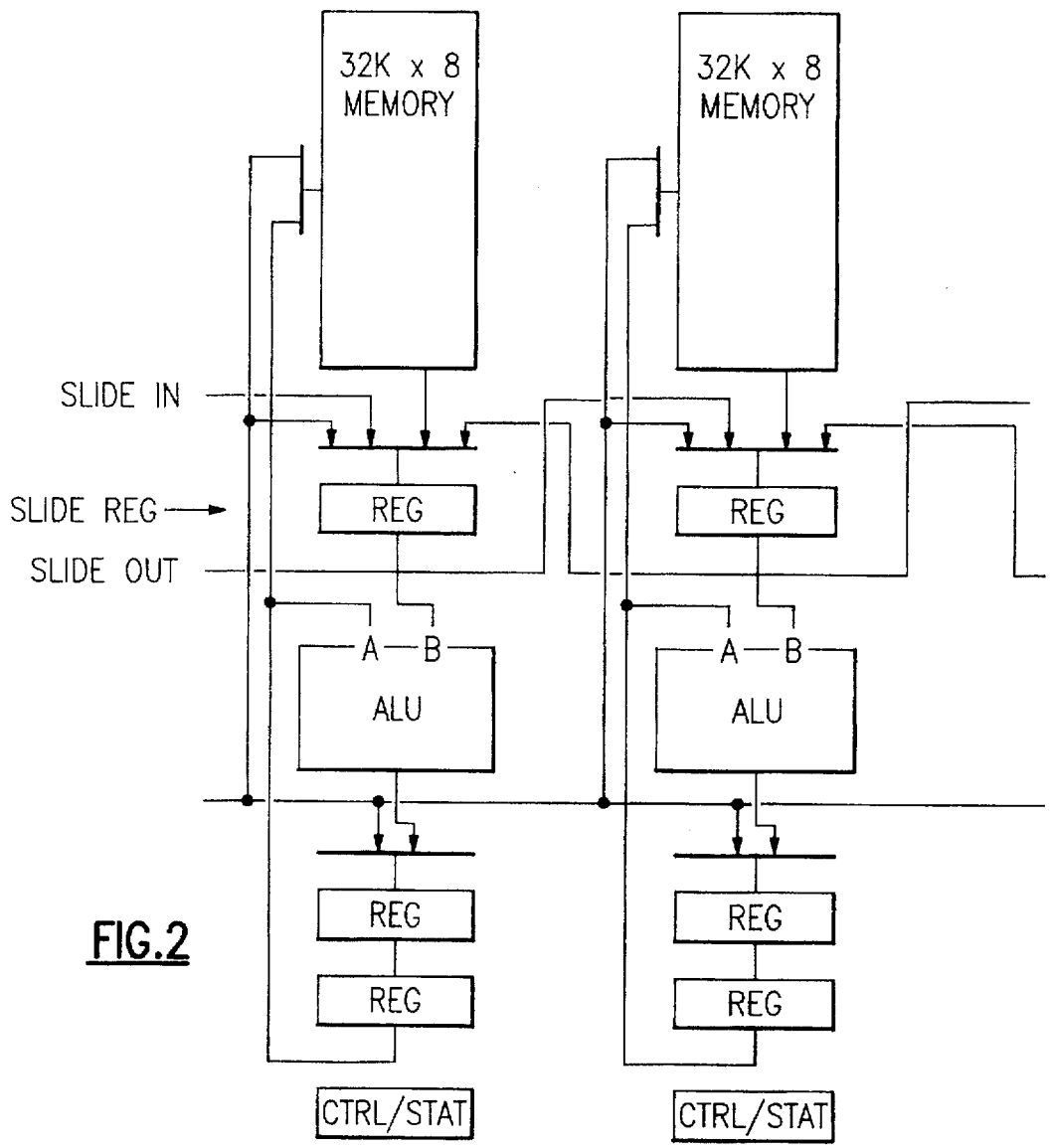
FIG. 2 shows a picket in a diagram of our preferred embodiment of the logic within one picket and its neighbors.
Figure 3:
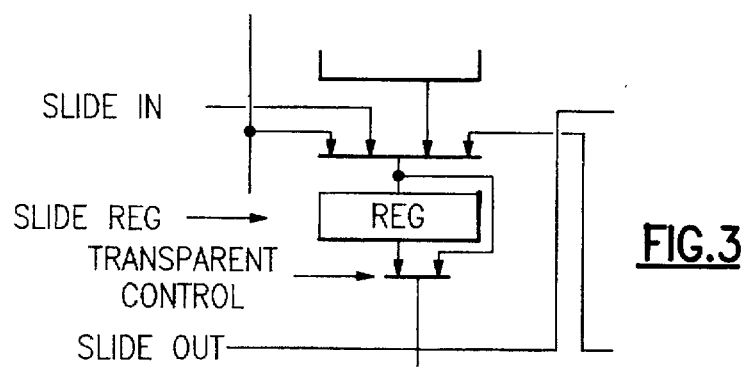
FIG. 3 illustrates the transparent latch which is provided for the array processor of our preferred system, which focuses on the slide register and an embodiment of transparency.

FIG. 2 shows our preferred embodiment of the logic within one picket and its two neighboring pickets, and the slide bus. Each picket has its slide register (REG), illustrated by the slide in, slide out communication via picket slide registers. The slide register provides input to the ALU of the picket. Thus, FIG. 2 shows, in more detail, two of the "pickets" shown in FIG. 1. The slide register is shown between the memory block and the ALU block. Simple left/right communication can be extended past several intermediate pickets (transparent) to include point-to-point communication with pickets farther away than an immediate neighbor. FIG. 3 shows the transparent control function where the control has an input from the slide register and an output to the ALU shown in FIG. 2.

We will now address point-to-point communication between pickets where the slide bus, picket addressing which supports dozing picket, and the control of communication using the slide bus and slide registers are elaborated.

Simple left/right communication can be extended to include point-to-point communication with pickets farther away than an immediate neighbor. With appropriate controls, it is possible to support several non-overlapping point-to-point communications simultaneously.

The Slide Bus Structure

FIG. 2 shows the logic within one picket and its neighbors. The processing element or picket comprises a multibyte-wide parallel data flow, a significant amount of parallel memory (e.g. 32k–64k bytes), and a communication shift register or slide register.

A key feature of this register is its transparent mode. If picket number 3 is not a participant in a communication operation when picket 2 is passing information to picket 4, then picket 3 can be made transparent such that information that is placed on the slide bus by picket 2 would flow through picket 3 and be immediately available to be clocked into picket 4. This transparency feature can be applied to several successive pickets permitting slides over several pickets in one clock cycle.

Control of the slide bus comes from broadcast commands issued by the array controller called a subsystem controller or micro-controller. Each picket, however, has the ability to modify this command to accomplish the described communication operations. To this end, each picket can interpret the command to become a transmitter, receiver, terminating element, or other functions as commonly required in data transmission.

A key feature of our byte-wide approach to the SLIDE BUS is picket transparency. The register in the picket can be made to be transparent if the picket is not an active participant in the processing taking place. When the register is transparent, data that is transfered to the picket from the right is passed through the picket to the picket on the left, with no intervening clocks required.

The transparent mode is designed into the logic that makes up the latch. The concept can be visualized by considering that the register latch can be bypassed when transparent, as shown in FIG. 3. For an efficient implementation, this bypass function in our preferred embodiment is integral with the latch. There are several such latch designs which are appropriate.

FIG. 3 is used to enable visualization of a tranparent latch. The slide bus is made transparent when the array controller has not activated the picket and loaded it with data or if the picket has been disabled. Also, the slide bus of a picket will be transparent if the picket is temporarily in DOZE mode and is not participating in the current processing.

The slide bus has the ability to handle the following functions:

SLIDE LEFT permits the SIMD controller to cause all active pickets to transfer data to the picket on the immediate left and to accept data from the picket on the immediate right.

SLIDE RIGHT permits the SIMD controller to cause all active pickets to transfer data to the picket on the immediate right and to accept data from the picket on the immediate left.

BROADCAST can be performed on the slide bus. All of the pickets are commanded to be transparent. Then, a data source inserts data at one end of the bus. The data then flows through the transparent bus to the other end such that all of the pickets have access to the data. All active pickets then capture the data and transfer it into the picket for processing. Note that the propagation time through the bus must be accommodated by the controller. This delay includes the active circuit delay of a few gates in each of the pickets in the path.

The source of broadcast data can be the controller of the SIMD array, or it can be one of the pickets. It is particularly useful to have a "successful" picket update other pickets by broadcasting information and selectively capturing the information in interested pickets.

MULTI-PICKET MOVES can be performed on the slide bus by identifying the source picket and the destination picket and then causing all of the intervening segment of pickets to go transparent. Multiple transfers can be accomplished at the same time if the segments do not overlap.

The slide bus approach can be used to bypass faulty pickets by simply making the Slide Latch of the faulty picket transparent such that data will pass through it to the next active picket. This technique can apply to inactive pickets in addition to faulty ones.

Control of the slide bus

Control of the slide function involves control of all activities during the clock time of the transfer. There are four functions to control:

Receive from the left bus,
Receive from the right bus,
Clock the latch (save the data), and
Activate transparent mode.

These functions are combined into two controls within the picket. One indicates the direction of the transfer. This function comes from the array controller and is not modified by the picket. Thus, all of the transfers during one cycle are in the same direction. The second control indicates that the picket latches the data or passes it on. This is tied to the picket DOZE indicator in such a way that when the picket is active, the Slide Register captures the data, and when it is not active (DOZE) it passes the data on.

Moving the data between the Slide Latch and the picket Memory takes place in the clock cycle before or after the picket to picket communication cycle, and so are not considered here.

Method of identifying pickets in an environment with failed pickets

Much of the activity that takes place in a SIMD array is "array" activity, and there is no reason to be able to identify or isolate specific pickets. In fact, much of the control of activity within an array is by classes of content. One command might be "all pickets with a value larger than 360—disable yourself."

But there are other times when information or activity must be directed at a specific picket. Another requirement for specific addressing is the need to pair off or otherwise group pickets into numerically determined sets. However, pickets can become active and then inactive in a fairly dynamic way, and of course, failures can occur.

To accommodate these requirements, there are two picket addressing schemes. The physical addressing scheme is determined at time of manufacture and is used by the controller to access a specific physical picket. A second numbering scheme is used to identify a logical picket address. The logical addresses that identify the active pickets in physical address order are stored in each picket memory at a specific memory address. Of course, the logical addresses must be adjusted each time a picket is added to or subtracted from the array.

To remove a picket from the middle of an array, we adjust the logical address of all pickets with larger picket addresses. The procedure for adjusting the logical addresses follows in steps 1–4 below:

1. Turn off all pickets with logical addresses less than the one being removed, using one command.
2. All other pickets pass their logical address to the next higher one with two commands. The controller updates its physical to logical address map some way.
3. Application dependent data movement occurs here if data must be linked to logical address.
4. Controller now disables the picket being removed using its physical address.

This simple, low overhead scheme is an important part of the control of a parallel SIMD array in our preferred embodiment.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. An array processor comprising:
  a plurality of processing elements;
  a plurality of communication links which interconnect said processing elements in an array topology for interprocessing element communication;
  an array controller coupled to said plurality of processing elements to provide a single instruction stream to the processing elements;
  wherein each of said processing elements includes a processor coupled with a dedicated locally addressable memory, and a parallel communication register coupled to at least one of said communication links, said parallel communication register having a transparent mode which allows for communication of data between two processing elements via at least one intervening processing element in a single communication cycle, each intervening processing element with its parallel communication register in the transparent mode such that the data passes through the intervening processing element, from a first one of the communication links coupled to the parallel communication register of the intervening processing element to a second one of the communication links coupled to the parallel communication register of the intervening processing element, without being stored in the intervening processing element; and
  including a broadcast function wherein data inserted onto a local region of said communication links by said array controller or one of said processing elements is communicated in a single propagation cycle time through the parallel communication registers of a group of said processing elements each with its parallel communication register in the transparent mode, and is then captured by selected processing elements among said group by removing the parallel communication registers of said selected processing elements from the transparent mode.

2. An array processor according to claim 1, wherein a processing element is a picket comprising elements for multibyte-wide parallel data flow, a parallel memory, and a parallel communication register functioning as a slide register.

3. An array processor according to claim 2, wherein a processing element communication register can be made transparent under control of the array controller or by control signals within a picket, such that a picket in SIMD mode decides locally if it participates in a specific data transfer.

4. An array processor according to claim 2, wherein the array processor identifies a logical picket address that identifies active pickets and which are stored in each picket memory at a specific memory address, which logical addresses are adjusted each time a picket is added to or subtracted from the array.

5. An array processor according to claim 2, wherein the array processor removes a picket from the middle of an array by changing the logical address of a pickets with larger picket addresses by:
  turning off all pickets with logical addresses less than the one being removed, using one command, and
  causing all other pickets to pass their logical address to the next higher one with two commands, and
  by providing that application dependent data movement takes place if data must be linked to a logical address, and
  causing the controller to disable a picket being removed using its physical address.

6. An array processor according to claim 1, wherein a processing element communication register is selectively made transparent such that data will pass through any intervening transparent pickets to the first one in the path that is not transparent.

7. An array processor according to claim 6, wherein a processing element communication register selectively operates as a transparent communication register providing a system bypass for a faulty picket in a slide path for system fault tolerance.

8. An array processor according to claim 6, wherein a processing element communication register selectively bypasses a good but unassigned picket in a slide path for addition and deletion of pickets to or from an active processing array.

9. An array processor according to claim 6, wherein a processing element communication register selectively enters a transparent mode in which an intermediate picket which is not in a communication operation lies between two pickets which have a need for communicated data, the intermediate picket which is not a participant in a communication operation passes information to its destination in a transparent mode, such that information that is placed on a slide bus by a sending picket flows through the intermediate picket and becomes immediately available for clocking into the destination picket.

10. An array processor according to claim 9, wherein the transparent mode is applied to several successive pickets permitting slides over several pickets in one clock cycle.

11. An array processor according to claim 9, wherein the transparent mode is selectively applied to a slide bus for transparent moves when the array controller has not activated the picket and loaded it with data, or if the picket has been disabled, or is in doze mode.

12. An array processor according to claim 1, wherein the array controller generates control signals to selectively provide operations including:
  SLIDE LEFT to cause all active pickets to transfer data to the picket on the immediate left and accept data from the picket on the immediate right;
  SLIDE RIGHT to cause all active pickets to transfer data to the picket on the immediate right and accept data from the picket on the immediate left; and cause or permit a picket to
  BROADCAST on the communication path functioning as a slide bus by commanding processing elements to be transparent, capturing the information in interested pickets.

13. An array processor according to claim 12, wherein MULTI-PICKET MOVES are selectively performed on the slide bus by identifying the source picket and the destination picket and then causing all of the intervening segment of pickets to go transparent.

14. An array processor according to claim 12, wherein a slide bus selectively bypasses faulty pickets by simply making a slide latch of an inactive or faulty picket transparent such that data will pass it to the next active picket.

15. An array processor according to claim 12, wherein a control slide function is provided for controlling activities during clock time of transfer between processing elements, said control slide function including:
  Receive from the left bus
  Receive from the right bus
  Clock the latch (save the data)
  Activate transparent mode.

16. An array processor according to claim 11, wherein the control function is combined into two controls within a picket and one of which indicates the direction of the transfer and comes from the array controller and is not modified by the picket for controlling transfers during one cycle in the same direction, and a second control function which indicates that the picket latches the data, or passes it on is tied to a picket DOZE indicator in such a way that when the picket is active, the a slide register captures the data, and when it is not active it passes the data on.

17. An array processor according to claim 1, wherein the array processor selectively moves data between a slide latch and a picket memory which takes place in the clock cycle before or after the picket to picket communication cycle.

18. An array processor for performing SIMD functions, comprising:
  a data processing system having an array controller;
  a plurality of array processing elements; and
  an interconnection path for interprocessing element communication;
  each of said array processing elements having a processor coupled with a dedicated locally addressable memory by a parallel data path, and having a parallel communication register functioning as a slide register for interprocessor communication allowing for multiple processing element communication in a single communication cycle, said multiple processing element communication including communication between two array processing elements via at least one intervening array processing element; and
  wherein the array processor selectively removes a picket from the middle of the array by changing the logical address of pickets with larger picket addresses by:
    turning off all pickets with logical addresses less than the one being removed, using one command;
    causing all other pickets to pass their logical address to the next higher one with two commands;
    providing that application dependent data movement takes place if data must be linked to a logical address; and
    causing the controller to disable a picket being removed using its physical address.

* * * * *